United States Patent
Niergarth et al.

(10) Patent No.: US 11,187,156 B2
(45) Date of Patent: Nov. 30, 2021

(54) THERMAL MANAGEMENT SYSTEM

(71) Applicant: General Electric Company, Schenectady, NY (US)

(72) Inventors: Daniel Alan Niergarth, Cincinnati, OH (US); Sridhar Adibhatla, Glendale, OH (US); Brandon Wayne Miller, Liberty Township, OH (US); David William Crall, Loveland, OH (US)

(73) Assignee: General Electric Company, Schenectady, NY (US)

( * ) Notice: Subject to any disclaimer, the term of this patent is extended or adjusted under 35 U.S.C. 154(b) by 342 days.

(21) Appl. No.: 15/819,327

(22) Filed: Nov. 21, 2017

(65) Prior Publication Data
US 2019/0153952 A1    May 23, 2019

(51) Int. Cl.
*F02C 7/224*    (2006.01)
*F02C 7/14*    (2006.01)
(Continued)

(52) U.S. Cl.
CPC .......... *F02C 7/224* (2013.01); *B01D 19/0005* (2013.01); *B01D 19/0052* (2013.01); *B01D 19/0063* (2013.01); *B01D 19/02* (2013.01); *F02C 7/14* (2013.01); *F02C 9/26* (2013.01); *B64D 37/34* (2013.01); *F05D 2220/323* (2013.01); *F05D 2240/35* (2013.01);
(Continued)

(58) Field of Classification Search
CPC ... B64D 37/34; F05D 2260/213; F02C 7/224; F23K 2900/05082
See application file for complete search history.

(56) References Cited

U.S. PATENT DOCUMENTS

| 2,582,842 A | 1/1952 | Messinger |
| 3,895,243 A | 7/1975 | Amend et al. |

(Continued)

FOREIGN PATENT DOCUMENTS

| CN | 1644892 A | 7/2005 |
| CN | 1899661 A | 1/2007 |

(Continued)

OTHER PUBLICATIONS

U.S. Appl. No. 15/819,443, filed Nov. 21, 2017.
Combined Chinese Search Report and Office Action Corresponding to Application No. 201811381301 dated Oct. 20, 2020.

*Primary Examiner* — Ehud Gartenberg
*Assistant Examiner* — Jacek Lisowski
(74) *Attorney, Agent, or Firm* — Dority & Manning, P.A.

(57) ABSTRACT

A combustion engine includes a combustion section; a fuel delivery system for providing a fuel flow to the combustion section, the fuel delivery system including an oxygen reduction unit for reducing an oxygen content of the fuel flow; a thermal management system including a heat sink heat exchanger, the heat sink heat exchanger in thermal communication with the fuel delivery system at a location downstream of the oxygen reduction unit; and a control system including a sensor operable with the fuel delivery system for sensing data indicative of an operability of the oxygen reduction unit and a controller operable with the sensor, the controller configured to initiate a corrective action based on the data sensed by the sensor indicative of the operability of the oxygen reduction unit.

20 Claims, 7 Drawing Sheets

(51) Int. Cl.
*F02C 9/26* (2006.01)
*B01D 19/00* (2006.01)
*B01D 19/02* (2006.01)
*B64D 37/34* (2006.01)

(52) U.S. Cl.
CPC .. *F05D 2260/213* (2013.01); *F05D 2260/221* (2013.01); *F05D 2260/80* (2013.01)

(56) References Cited

U.S. PATENT DOCUMENTS

| | | | |
|---|---|---|---|
| 4,505,124 | A | 3/1985 | Mayer |
| 4,550,573 | A | 11/1985 | Rannenberg |
| 4,773,212 | A | 9/1988 | Griffin et al. |
| 5,149,018 | A | 9/1992 | Clark |
| 5,341,636 | A | 8/1994 | Paul |
| 5,667,168 | A | 9/1997 | Fluegel |
| 5,722,241 | A | 3/1998 | Huber |
| 5,724,806 | A | 3/1998 | Homer |
| 6,182,435 | B1 | 2/2001 | Niggemann et al. |
| 6,250,097 | B1 | 6/2001 | Lui et al. |
| 6,415,595 | B1 | 7/2002 | Wilmot, Jr. et al. |
| 6,435,454 | B1 | 8/2002 | Engelhardt |
| 6,701,717 | B2 | 3/2004 | Flatman et al. |
| 7,260,926 | B2 | 8/2007 | Sabatino et al. |
| 7,377,098 | B2 | 5/2008 | Walker et al. |
| 7,398,641 | B2 | 7/2008 | Stretton et al. |
| 7,836,680 | B2 | 11/2010 | Schwarz et al. |
| 7,882,704 | B2 | 2/2011 | Chen |
| 7,966,807 | B2 | 6/2011 | Norris et al. |
| 7,987,676 | B2 | 8/2011 | Ast et al. |
| 8,177,884 | B2 | 5/2012 | Schmidt et al. |
| 8,261,258 | B1 | 9/2012 | Chillar et al. |
| 8,499,822 | B2 | 8/2013 | Bulin et al. |
| 8,522,572 | B2 | 9/2013 | Coffinberry et al. |
| 8,765,070 | B2 | 7/2014 | Norton et al. |
| 8,789,377 | B1 | 7/2014 | Brostmeyer |
| 8,858,161 | B1 | 10/2014 | Ryznic et al. |
| 8,944,367 | B2 | 2/2015 | Bystry, Jr. et al. |
| 8,978,353 | B2 | 3/2015 | Norton et al. |
| 8,984,884 | B2 | 3/2015 | Xu et al. |
| 9,014,791 | B2 | 4/2015 | Held |
| 9,038,397 | B2 | 5/2015 | Papa et al. |
| 9,120,580 | B2 * | 9/2015 | Sampath ............ B01D 19/0031 |
| 9,567,095 | B2 | 2/2017 | McCarthy et al. |
| 9,580,185 | B2 | 2/2017 | Rhoden et al. |
| 2007/0006591 | A1 * | 1/2007 | Spadaccini ............. B01B 1/005 60/772 |
| 2009/0133380 | A1 | 5/2009 | Donnerhack |
| 2009/0188234 | A1 | 7/2009 | Suciu et al. |
| 2010/0212857 | A1 | 8/2010 | Bulin et al. |
| 2010/0313591 | A1 | 12/2010 | Lents et al. |
| 2011/0059377 | A1 * | 3/2011 | Scotto ............... H01M 8/04328 429/416 |
| 2012/0012782 | A1 * | 1/2012 | Scotto ..................... C01B 3/382 252/188.25 |
| 2012/0012783 | A1 * | 1/2012 | Scotto ............... H01M 8/04731 252/188.25 |
| 2012/0216502 | A1 | 8/2012 | Freund et al. |
| 2013/0186100 | A1 | 7/2013 | Rhoden et al. |
| 2014/0165570 | A1 | 6/2014 | Herring |
| 2014/0205446 | A1 | 7/2014 | Patsouris et al. |
| 2014/0345292 | A1 | 11/2014 | Diaz et al. |
| 2014/0360153 | A1 | 12/2014 | Papa et al. |
| 2015/0000291 | A1 | 1/2015 | Smith et al. |
| 2015/0040986 | A1 | 2/2015 | Tichborne et al. |
| 2015/0375868 | A1 * | 12/2015 | Smith ................... F02M 31/125 165/292 |
| 2016/0108814 | A1 | 4/2016 | Schmitz |
| 2016/0290214 | A1 | 10/2016 | Ekanayake et al. |
| 2016/0305440 | A1 * | 10/2016 | Laboda ................. B01D 45/14 |
| 2016/0356224 | A1 * | 12/2016 | Farnum ..................... F02C 7/30 |
| 2016/0369700 | A1 | 12/2016 | Ribarov et al. |
| 2017/0030266 | A1 | 2/2017 | Cerny et al. |
| 2017/0114721 | A1 | 4/2017 | Miller et al. |
| 2017/0001673 | A1 | 6/2017 | Miller et al. |
| 2017/0159566 | A1 | 6/2017 | Sennoun et al. |
| 2017/0321607 | A1 * | 11/2017 | Sweeney ................. F02C 7/185 |

FOREIGN PATENT DOCUMENTS

| | | |
|---|---|---|
| CN | 1927658 A | 3/2007 |
| EP | 2003311 A2 | 12/2008 |
| EP | 3018304 A1 | 5/2016 |
| EP | 3075957 A1 | 10/2016 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |

* cited by examiner

THERMAL MANAGEMENT SYSTEM

FIELD

The present subject matter relates generally to a thermal management system, and more specifically to a thermal management system operable with a fuel delivery system of a gas turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator.

In at least certain embodiments, the turbomachine and fan are at least partially surrounded by an outer nacelle. With such embodiments, the outer nacelle defines a bypass airflow passage with the turbomachine. Additionally, the turbomachine is supported relative to the outer nacelle by one or more outlet guide vanes/struts.

During operation of the gas turbine engine, various systems may generate a relatively large amount of heat. Thermal management systems of the gas turbine engine may collect heat from one or more of these systems to maintain a temperature of such systems within an acceptable operating range. The thermal management systems may reject such heat through one or more heat exchangers. In at least certain embodiments, at least one of the heat exchangers may be integrated into one or more components exposed to the bypass airflow passage, such as one or more struts extending between the turbomachine and the outer nacelle.

Although the bypass airflow passage can be a safe and relatively efficient heat sink for the thermal management system, inclusion of one or more heat exchangers integrated into one or more components exposed to the bypass airflow passage may have an adverse effect on an airflow through the bypass airflow passage. Additionally, the inventors of the present disclosure have found that it may be useful to use a fuel flow of the gas turbine engine as a heat sink. However, heating the fuel flow of the gas turbine engine without taking certain precautions may result in damage to the gas turbine engine. Accordingly, a thermal management system and fuel delivery system capable of transferring heat more reliably to a fuel flow and with a reduced risk of damage to the gas turbine engine would be useful.

BRIEF DESCRIPTION

Aspects and advantages of the invention will be set forth in part in the following description, or may be obvious from the description, or may be learned through practice of the invention.

In one exemplary embodiment of the present disclosure, a combustion engine is provided. The combustion engine including a combustion section; a fuel delivery system for providing a fuel flow to the combustion section, the fuel delivery system including an oxygen reduction unit for reducing an oxygen content of the fuel flow; a thermal management system including a heat sink heat exchanger, the heat sink heat exchanger in thermal communication with the fuel delivery system at a location downstream of the oxygen reduction unit; and a control system including a sensor operable with the fuel delivery system for sensing data indicative of an operability of the oxygen reduction unit and a controller operable with the sensor, the controller configured to initiate a corrective action based on the data sensed by the sensor indicative of the operability of the oxygen reduction unit.

In certain exemplary embodiments the control system further includes a valve operable with at least one of the fuel delivery system or the thermal management system for modifying at least one of the fuel flow through the fuel delivery system or a heat exchange fluid flow through the thermal management system, and wherein initiating the corrective action includes operating the valve based at least in part on the data received from the sensor.

For example, in certain exemplary embodiments the thermal management system further includes a thermal transport bus in thermal communication with the heat sink heat exchanger and a heat source heat exchanger in thermal communication with the thermal transport bus, and wherein the valve is operable with at least one of the fuel delivery system or the thermal management system for modifying at least one of the fuel flow through the oxygen reduction unit, the fuel flow through the heat sink heat exchanger, a heat exchange fluid flow through the heat sink heat exchanger, or the heat exchange fluid flow through the heat source heat exchanger.

For example, in certain exemplary embodiments the thermal management system further includes a thermal transport bus in thermal communication with the heat sink heat exchanger, wherein the valve is a bypass valve operable with the thermal transport bus of the thermal management system at a location upstream of the heat sink heat exchanger for diverting at least a portion of the heat exchange fluid flow within the thermal transport bus around the heat sink heat exchanger to a location downstream of the heat sink heat exchanger.

For example, in certain exemplary embodiments the thermal management system further includes a thermal transport bus in thermal communication with the heat sink heat exchanger and a heat source heat exchanger in thermal communication with the thermal transport bus, wherein the valve is a bypass valve operable with the thermal transport bus of the thermal management system at a location upstream of the heat source heat exchanger for diverting at least a portion of the heat exchange fluid within the thermal transport bus around the heat source heat exchanger to a location downstream of the heat source heat exchanger.

For example, in certain exemplary embodiments the valve is a bypass valve operable with the fuel delivery system at a location upstream of the heat sink heat exchanger for diverting at least a portion of the fuel flow around the heat sink heat exchanger to a location downstream of the heat sink heat exchanger.

In certain exemplary embodiments the oxygen reduction unit is a fuel oxygen conversion unit, and wherein the sensor of the control system is a fuel oxygen conversion sensor for sensing data indicative of a parameter of the fuel oxygen conversion unit.

In certain exemplary embodiments the sensor of the control system is a first sensor, and wherein the control system further includes a second sensor also operable with the fuel delivery system for sensing data indicative of the operability of the oxygen reduction unit.

For example, in certain exemplary embodiments the oxygen reduction unit is a fuel oxygen conversion unit, wherein the first sensor is a fuel oxygen conversion sensor for sensing data indicative of a parameter of the fuel oxygen conversion unit, and wherein the second sensor is an oxygen sensor for sensing data indicative of an oxygen level in the fuel flow within the fuel delivery system downstream of the fuel oxygen conversion unit.

In certain exemplary embodiments the combustion engine is an aeronautical gas turbine engine.

In certain exemplary aspects, a method is provided for operating a combustion engine having a combustion section, a fuel delivery system for providing a fuel flow to the combustion section, and a thermal management system having a heat sink heat exchanger in thermal communication with the fuel delivery system. The method includes transferring heat to the fuel delivery system using the heat sink heat exchanger of the thermal management system; monitoring a fuel delivery system health of the fuel delivery system, the fuel delivery system health indicative of an operability of an oxygen reduction unit of the fuel delivery system, the oxygen reduction unit positioned upstream of the heat sink heat exchanger in the fuel delivery system for reducing an oxygen content of the fuel flow; and performing a maintenance operation in response to monitoring the fuel delivery system health of the fuel delivery system.

In certain exemplary aspects monitoring the fuel delivery system health of the fuel delivery system includes sensing data indicative of the operability of the oxygen reduction unit of the fuel delivery system.

For example, in certain exemplary aspects sensing data indicative of the operability of the oxygen reduction unit includes sensing a parameter of the oxygen reduction unit with a first sensor and sensing an oxygen level of the fuel flow downstream of the oxygen reduction unit with a second sensor.

For example, in certain exemplary aspects sensing data indicative of the operability of the oxygen reduction unit further includes receiving data indicative of a failure condition from one of the first sensor or the second sensor; receiving data indicative of the operability of the oxygen reduction unit being within a desired operability range from the other of the first sensor or the second sensor; and determining the operability of the oxygen reduction unit is within the desired operability range.

For example, in certain exemplary aspects transferring heat to the fuel delivery system using the heat sink heat exchanger of the thermal management system includes transferring heat from a thermal bus of the thermal management system to the fuel delivery system using the heat sink heat exchanger, wherein sensing data indicative of the operability of the oxygen reduction unit includes determining the oxygen reduction unit is operating outside a desired operability range, and wherein performing the maintenance operation includes modifying at least one of a fuel flow through the fuel delivery system or a heat exchange fluid flow through the thermal bus in response to determine the oxygen reduction unit is operating outside the desired operability range.

For example, in certain exemplary aspects modifying at least one of the fuel flow through the fuel delivery system or the heat exchange fluid flow through the thermal bus includes diverting at least a portion of the fuel flow from a location upstream of the oxygen reduction unit around the oxygen reduction unit to a location downstream of the oxygen reduction unit.

For example, in certain exemplary aspects modifying at least one of the fuel flow through the fuel delivery system or the heat exchange fluid flow through the thermal bus includes diverting at least a portion of the fuel flow from a location upstream of the heat sink heat exchanger around the heat sink heat exchanger to a location downstream of the heat sink heat exchanger.

For example, in certain exemplary aspects modifying at least one of the fuel flow through the fuel delivery system or the heat exchange fluid flow through the thermal bus includes diverting at least a portion of the heat exchange fluid flow through the thermal bus from a location upstream of the heat sink heat exchanger around the heat sink heat exchanger to a location downstream of the heat sink heat exchanger, from a location upstream of the heat source heat exchanger around the heat source heat exchanger to a location downstream of the heat source heat exchanger, or both.

In certain exemplary aspects monitoring the fuel delivery system health of the fuel delivery system includes monitoring an operability parameter of the fuel delivery system indicative of an operating time of the combustion engine, a number of operating cycles of the combustion engine, or both.

For example, in certain exemplary aspects performing the maintenance operation in response to monitoring the fuel delivery system health of the fuel delivery system includes providing an indicator to a user of the combustion engine indicative of the operability parameter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
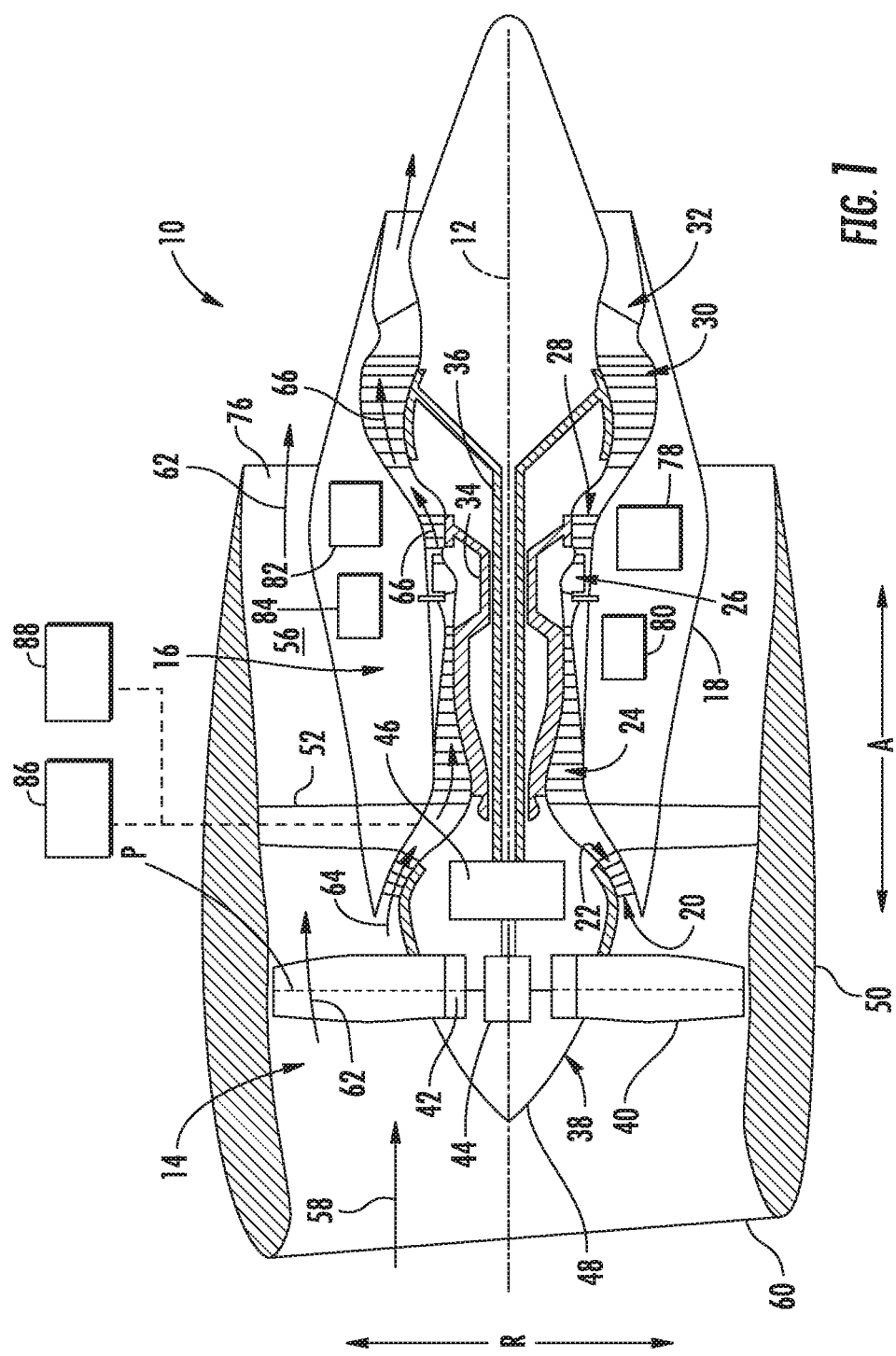
FIG. 1 is a schematic, cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Moreover, as used herein, the terms "controller" and "computer," and related terms, e.g., "processing device," "computing device," and "processor", are not limited to just those integrated circuits referred to in the art as a computer, but further broadly refers to one or more processing devices including one or more of a microcontroller, a microcomputer, a programmable logic controller (PLC), an application specific integrated circuit, and other programmable circuits, and these terms are used interchangeably herein. In the embodiments described herein, the computer or controller may additionally include memory. The memory may include, but is not limited to, a computer-readable medium, such as a random access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, the computer or controller may include one or more input channels and/or one or more output channels. The input channels may be, but are not limited to, computer peripherals associated with an operator interface such as a mouse and a keyboard, or sensors, such as engine sensors associated with an engine, such as a gas turbine engine, or components thereof, for determining operating parameters. Furthermore, in the exemplary embodiment, the output channels may include, but are not be limited to, an operator interface monitor, or the output channels may be linked to various components to control such components based, e.g., on data reviewed from the input channels and/or data or instructions stored in the memory. For example, the memory may store software or other instructions, which when executed by the controller or processor allow the controller to perform certain operations or functions (such as one or more the exemplary methods described herein). The term "software" may include any computer program stored in memory, or accessible by the memory, for execution by, e.g., the controller, processor, clients, and servers.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially-spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. As stated, for the embodiment shown, the turbofan engine 10 is a high bypass turbofan engine 10. Accordingly, for the embodiment depicted, the bypass ratio defined by the turbofan engine 10 is greater than about 6:1 and up to about 30:1.

The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Figure 3:
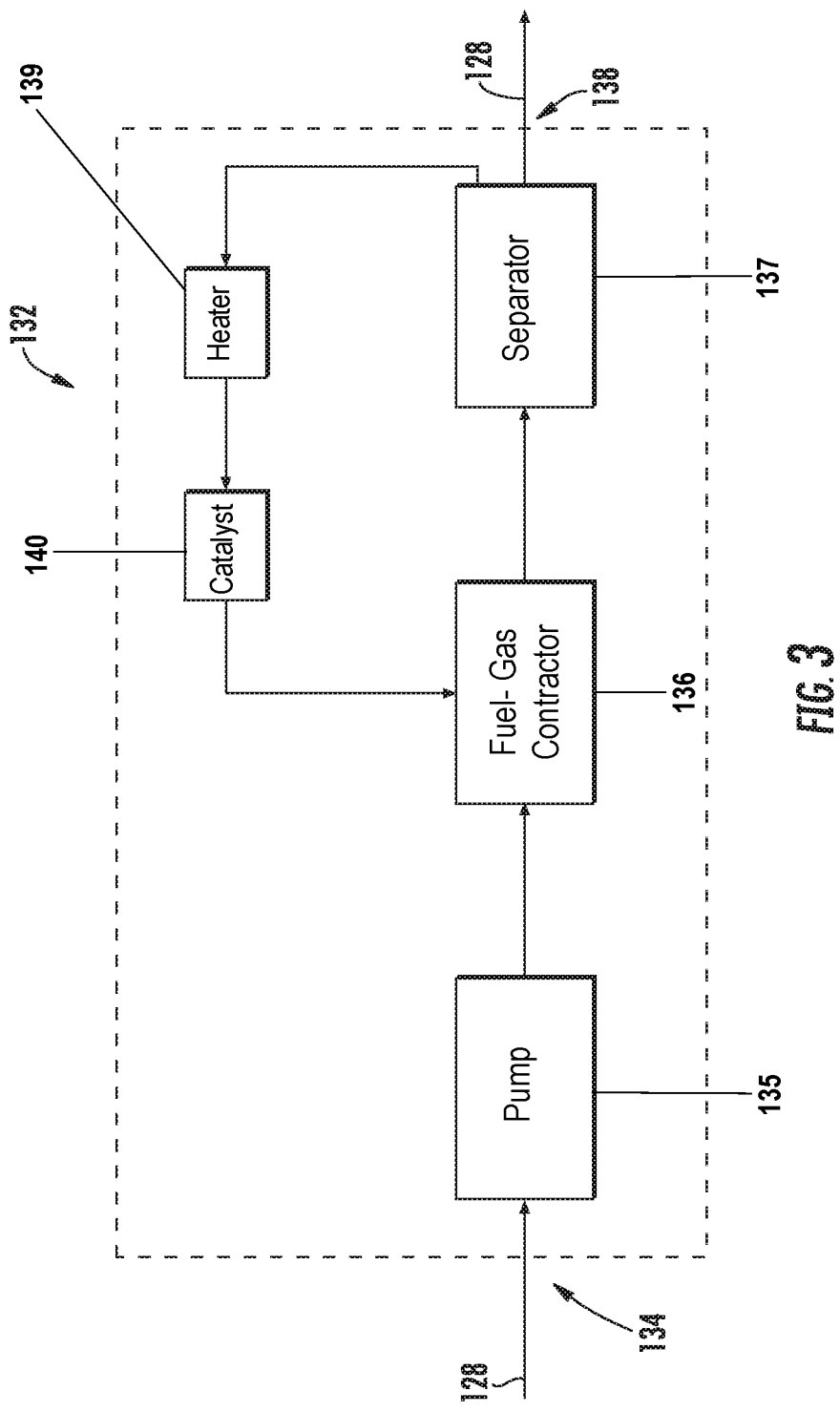
FIG. 3 is a simplified schematic view of an oxygen reduction unit in accordance with an exemplary embodiment of the present disclosure.

Moreover, as is depicted schematically, the exemplary turbofan engine 10 further includes various accessory systems to aid in the operation of the turbofan engine 10 and/or an aircraft including the turbofan engine 10 (e.g., FIG. 3). For example, the exemplary turbofan engine 10 further includes a main lubrication system 78 configured to provide a lubricant to, e.g., various bearings and gear meshes in the compressor section (including the LP compressor 22 and HP compressor 24), the turbine section (including the HP turbine 28 and the LP turbine 30), the HP spool 34, the LP spool 36, and the power gear box 46. The lubricant provided by the main lubrication system 78 may increase the useful life of such components and may remove a certain amount of heat from such components. Additionally, the turbofan engine 10 includes a cooled cooling air (CCA) system 80 (sometimes also referred to as a "compressor cooling air system") for providing air from one or both of the HP compressor 24 or LP compressor 22 to one or both of the HP turbine 28 or LP turbine 30. Moreover, the exemplary turbofan engine 10 includes an active thermal clearance control (ACC) system 82 for cooling a casing of the turbine section to maintain a clearance between the various turbine rotor blades and the turbine casing within a desired range throughout various engine operating conditions. Furthermore, the exemplary turbofan engine 10 includes a generator lubrication system 84 for providing lubrication to an electronic generator, as well as cooling/heat removal for the electronic generator. The electronic generator may provide electrical power to, e.g., a startup electric motor for the turbofan engine 10 and/or various other electronic components of the turbofan engine 10 and/or an aircraft including the turbofan engine 10.

As is also depicted schematically, the exemplary turbofan engine 10 depicted drives or enables various other accessory systems, e.g., for an aircraft (not shown) including the exemplary turbofan engine 10. For example, the exemplary turbofan engine 10 provides compressed air from the compressor section to an environmental control system (ECS) 86. The ECS 86 may provide an air supply to a cabin of the aircraft for pressurization and thermal control. Additionally, air may be provided from the exemplary turbofan engine 10 to an electronics cooling system 88 for maintaining a temperature of certain electronic components of the turbofan engine 10 and/or aircraft within a desired range.

Prior turbofan engines 10 and/or aircrafts included individual heat exchangers for each of these accessory systems to remove heat from air and/or lubrication in such systems. However, aspects of the present disclosure may include a thermal management system 100 (see FIG. 2) for transferring heat from some or all of such accessory systems to more efficiently remove such heat and/or utilize such heat.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, etc. Additionally, in still other exemplary embodiments, the exemplary turbofan engine 10 may include or be operably connected to any other suitable accessory systems and may be configured in any other suitable manner. Additionally, or alternatively, the exemplary turbofan engine 10 may not include or be operably connected to one or more of the accessory systems discussed above.

Figure 2:
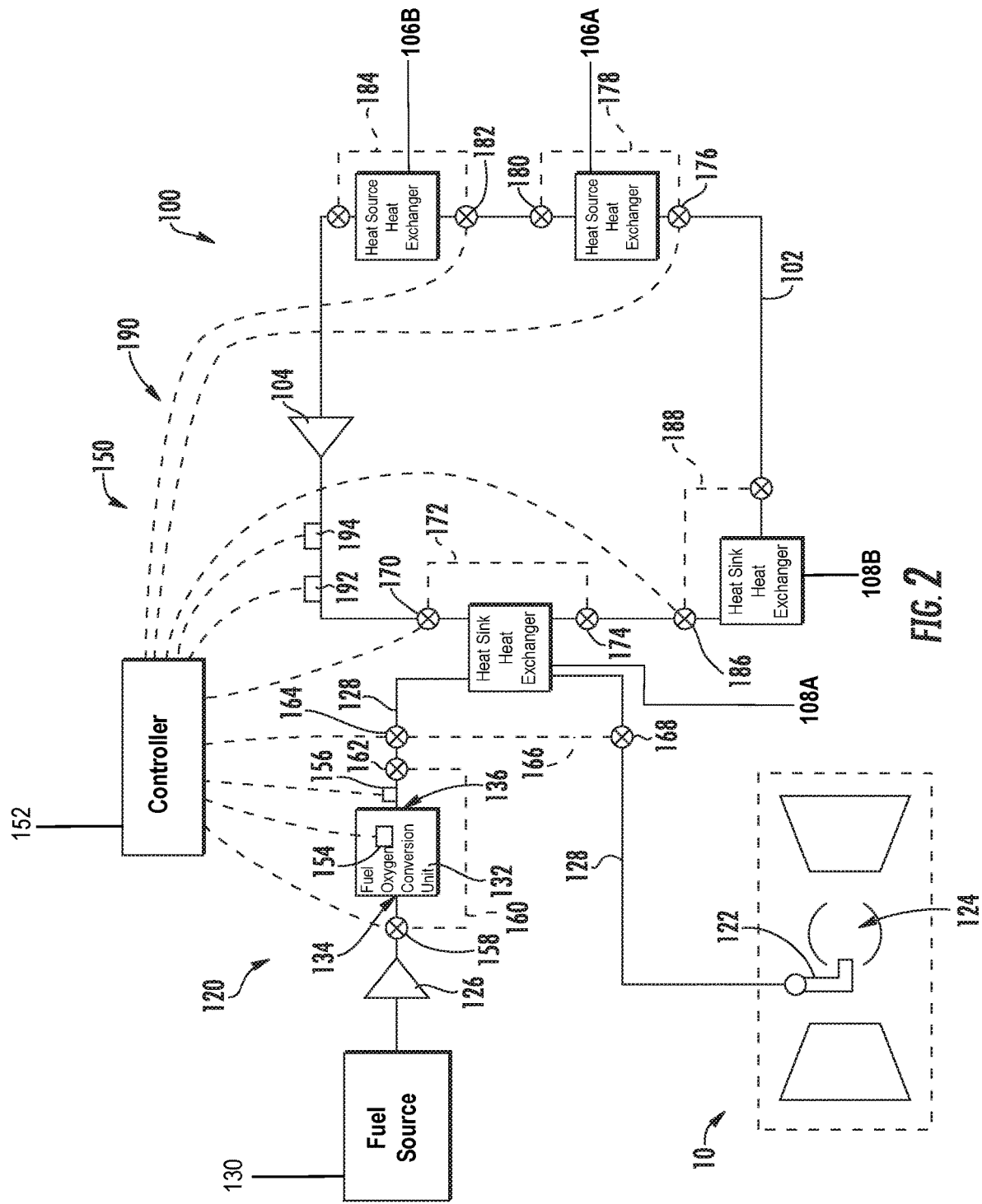
FIG. 2 is a simplified schematic view of a thermal management system and fuel delivery system in accordance with an exemplary embodiment of the present disclosure.

Referring now to FIG. 2, a schematic, flow diagram is provided of a thermal management system 100 and fuel delivery system 120, the thermal management system 100 operable with the fuel delivery system 120, in accordance with an exemplary embodiment of the present disclosure. In certain exemplary embodiments, thermal management system 100 may be incorporated into the exemplary turbo fan engine 10 described above with reference to FIG. 1, and further, the fuel delivery system 120 may be configured for providing fuel to the exemplary combustion section 26 of the turbine turbofan engine 10.

As is depicted in FIG. 2, the fuel delivery system 120 may be integrated into a gas turbine engine 10 (a portion of which is depicted schematically for reference; see also FIG. 1). More specifically, the fuel delivery system 120 may be integrated into the gas turbine engine and configured for providing a fuel flow to a combustion section 26 of the gas turbine engine. For example, the exemplary fuel delivery system 120 depicted generally includes one or more fuel nozzles 122 configured to provide a mixture of fuel and air to a combustion chamber 124 of the combustion section 26, as well as a fuel pump 126 and a plurality of main fuel lines 128. The fuel pump 126 may provide for the fuel flow through the plurality of main fuel lines 128 from a fuel source 130, such as a fuel tank, to the plurality of fuel nozzles 122.

In addition, the exemplary fuel delivery system 120 includes an oxygen reduction unit for reducing an oxygen content within the fuel flow. More specifically, for the embodiment depicted, the oxygen reduction unit is configured as a fuel oxygen conversion unit 132, as will be discussed in greater detail below. As will be appreciated, the fuel flow provided through the fuel delivery system 120 may generally include an amount of dissolved oxygen, or free oxygen. The fuel oxygen conversion unit 132 may generally be configured for reducing this amount of dissolved oxygen in the fuel flow through the fuel delivery system 120. Reducing the amount of dissolved oxygen in the fuel flow may allow for the fuel flow to more effectively act as a heat sink during operation (discussed in greater detail below). More specifically, reducing the amount of dissolved oxygen in the fuel flow may allow for the fuel flow downstream of the fuel oxygen conversion unit 132 to accept heat from, e.g., the thermal management system 100, described below, with a reduced risk of formation of autooxidative reactions that can produce insoluble materials within the fuel flow, also known as "coking."

For example, referring now briefly to FIG. 3, a simplified, schematic view is provided of an exemplary fuel oxygen conversion unit 132 in accordance with an exemplary embodiment of the present disclosure. The exemplary fuel oxygen conversion unit 132 generally includes an inlet 134 for receiving the fuel flow. The inlet provides the fuel flow to a pump 135, which increases a pressure of the fuel, and subsequently provides the fuel flow to a fuel-gas contactor 136. As will be described also below, the fuel-gas contactor 136 is configured to receive the fuel flow from the pump 135, as well as a flow of gas, and mix the two streams to form a foam. It will be appreciated that the gas may generally be an oxygen free gas, an oxygen lean gas, or any other gas capable of reacting with oxygen to react with the foam formed by the fuel-gas contactor 136, and more specifically to react with the oxygen within the fuel to form a new compound, removing at least a portion of the oxygen from the fuel-gas foam.

The fuel-gas foam is then sent to a separator 137. The separator 137 is configured to separate the fuel from the reactant solution of the gas and oxygen within the fuel. For example, the separator 137 may be configured to separate a more dense fuel and less dense reactant gas. For example, the separator 137 may include a rotating drum wherein the more dense fuel is urged to a radially outer location, whereas the less dense reactant gas is maintained at the radially inner location. The fuel flow, with at least a portion of the free oxygen removed therefrom, is provided through an outlet 138 of the fuel oxygen conversion unit 132 back to the main fuel lines 128 of the fuel delivery system 120.

By contrast, the separated gas from the separator 137 (which may include, e.g., oxygen gas and fuel vapors), may then travel through a recirculation loop. The recirculation loop generally includes a heater 139 and a catalyst 140. The heater 139 is configured to heat the separated gas (e.g., the mixture of oxygen gas and fuel vapors), and provide such heated mixture to the catalyst 140. The catalyst 140, in turn, reacts the heated mixture (e.g., combusts the heated mixture). When the heated mixture is a combination of oxygen gas and fuel vapors, the combustion may result in carbon dioxide and water. With such an embodiment, the carbon dioxide gas may then be provided back to the contactor 136, while the water is provided elsewhere.

It will be appreciated that for the exemplary fuel oxygen conversion unit 132 depicted in FIG. 3, a temperature of the catalyst 140, as well as a flow rate of the flow of gas provided from the catalyst 142 the contactor 136 (which may also be referred to as a "stripping gas") may generally indicate the effectiveness/operability of the fuel oxygen conversion unit 132. It will also be appreciated, however, that the exemplary fuel oxygen conversion unit 132 provided in FIG. 3 is by way of example only. In other exemplary embodiments, the fuel oxygen conversion unit 132 may have any other suitable configuration for removing at least a portion of the oxygen content within the fuel flow of the fuel delivery system 120.

Moreover, it will be appreciated that in still other exemplary embodiments, any other suitable oxygen reduction unit may be provided for inducing the oxygen content within the fuel flow of the fuel delivery system 120. For example, in other embodiments, the oxygen reduction unit may instead be configured as a fuel deoxygenation unit configured to extract oxygen from the fuel flow across a membrane using, e.g., a vacuum or other oxygen lean gas. Other configurations are contemplated as well.

Referring now back to FIG. 2, as is also depicted, the thermal management system 100 generally includes a thermal transport assembly. More specifically, for the embodiment shown, the thermal transport assembly is a thermal transport bus 102. The thermal transport bus 102 includes an intermediary heat exchange fluid flowing therethrough and may be formed of one or more suitable fluid conduits. The heat exchange fluid may have a high temperature operating range. For example, the heat exchange fluid may a supercritical gas maintained at a relatively high operational pressure during operation, or alternatively, may be a molten metal, such as a molten metal alloy. Further, in still other embodiments, the heat exchange fluid may be any other suitable heat transfer fluid, such as a commercially available refrigerant, a heat transfer oil, etc.

A pump 104 is provided in fluid communication with the heat exchange fluid in the thermal transport bus 102 for generating a flow of the heat exchange fluid in/through the thermal transport bus 102. As viewed in FIG. 2, the pump 104 may generate a flow of the heat exchange fluid generally in a clockwise direction through the thermal transport bus 102. The pump 104 may be a rotary pump including an impeller, or alternatively may be any other suitable fluid pump. Additionally, the pump 104 may be powered by an electric motor, or alternatively may be in mechanical communication with and powered by, e.g., the HP shaft 34 or the LP shaft 36 of the turbofan engine 10. In still other embodiments, the pump 104 may be powered by an auxiliary turbine, which in turn may be powered by bleed air from a compressor section of a gas turbine engine within which the system 100 is incorporated.

Moreover, the exemplary thermal management system 100 includes one or more heat source heat exchangers 106 permanently or selectively in thermal communication with the thermal transport bus 102, or rather, in fluid communication with the heat exchange fluid within the thermal transport bus 102. Specifically, the thermal management system 100 depicted includes a plurality of heat source heat exchangers 106. The plurality of heat source heat exchangers 106 are each configured to transfer heat from one or more of the accessory systems of the turbofan engine 10 (or operable with the turbofan engine 10) to the heat exchange fluid in the thermal transport bus 102. For example, in certain exemplary embodiments, the plurality of heat source heat exchangers 106 may include one or more of: a heat recovery heat exchanger, such as a waste heat recovery heat exchanger, positioned in, e.g., the turbine section or exhaust section for recovering heat from an airflow therethrough; a CCA system heat source exchanger for transferring heat from a CCA system (such as CCA system 80); a main lubrication system heat exchanger for transferring heat from a main lubrication system (such as main lubrication system 78); an ACC system heat source exchanger for transferring heat from an ACC system (such as ACC system 82); a generator lubrication system heat source exchanger for transferring heat from a generator lubrication system (such as generator lubrication system 84); an ECS heat exchanger for transferring heat from an ECS (such as ECS 86); an electronics cooling system heat exchanger for transferring heat from an electronics cooling system (such as electronics cooling system 88); a vapor compression system heat exchanger; an air cycle system heat exchanger; and an auxiliary system(s) heat source exchanger. By way of example, the auxiliary system(s) heat source exchanger may be configured to transfer heat from one or more of a radar system, a defense system, passenger entertainment systems, etc. Accordingly, a thermal management system 100 in accordance with an exemplary embodiment of FIG. 2 may transfer heat from a variety of independent systems to the heat exchange fluid in the thermal transport bus 102 for removal.

For the embodiment depicted, there are two heat source heat exchangers 106 (i.e., a first heat source heat exchanger 106A and a second heat source heat exchanger 106B), the two heat source heat exchangers 106A, 106B each arranged in series flow along the thermal transport bus 102. However, in other exemplary embodiments, any other suitable number of heat source heat exchangers 106 may be included and one or more of the heat source heat exchangers 106 may be arranged in parallel flow along the thermal transport bus 102. For example, in other embodiments, there may be a single heat source exchanger 106 in thermal communication with the heat exchange fluid in the thermal transport bus, or alternatively, there may be at least three heat source heat exchangers 106, at least four heat source heat exchangers 106, at least five heat source heat exchangers 106, or at least six heat source heat exchangers 106 in thermal communication with heat exchange fluid in the thermal transport bus 102.

Additionally, the exemplary thermal management system 100 of FIG. 2 further includes one or more heat sink exchanger 108 permanently or selectively in thermal communication with the thermal bus 102 (also referred to as a "thermal transport bus"), and more specifically, with the heat exchange fluid in the thermal transport bus 102. The one or more heat sink exchangers 108 are located downstream of the plurality of heat source exchangers 106 along the thermal bus 102 and are configured for transferring heat from the heat exchange fluid in the thermal transport bus 102, e.g., to atmosphere, to fuel, to a fan stream, etc. For example, in certain embodiments the one or more heat sink exchangers 108 may include at least one of a fuel heat exchanger, a fan stream heat exchanger, a RAM heat exchanger, a bleed air heat exchanger, an engine intercooler, or a cold air output of am air cycle system. The fuel heat exchanger may be a "fluid to heat exchange fluid" heat exchanger wherein heat from the heat exchange fluid is transferred to a stream of liquid fuel for the turbofan engine 10. Moreover, the fan stream heat exchanger may generally the an "air to heat exchange fluid" heat exchanger which flows, e.g., bypass air over heat exchange fluid to remove heat from the heat exchange fluid. Additionally, the RAM heat exchanger may be configured as an "air to heat exchange fluid" heat exchanger integrated into one or both of the turbofan engine 10 or an aircraft including the turbofan engine 10. During operation, the RAM heat exchanger may remove heat from any heat exchange fluid therein by flowing a certain amount of RAM air over the RAM heat exchanger. Further, the bleed air heat exchanger is generally an "air to heat exchange fluid" heat exchanger which flows, e.g., bleed air from the LP compressor over heat exchange fluid to remove heat from the heat exchange fluid.

For the embodiment of FIG. 2, the one or more heat sink exchangers 108 of the thermal management system 100 depicted includes a plurality of individual heat sink exchangers 108. More particularly, for the embodiment of FIG. 2, the one or more heat sink exchangers 108 includes two heat sink exchangers 108 arranged in series. However, in other exemplary embodiments, the one or more heat sink exchangers 108 may include any other suitable number of heat sink exchangers 108. For example, in other exemplary embodiments, a single heat sink exchanger 108 may be provided, at least three heat sink exchangers 108 may be provided, at least four heat sink exchangers 108 may be provided, or at least five heat sink exchangers 108 may be provided. Additionally, in still other exemplary embodiments, two or more of the one or more heat sink exchangers 108 may alternatively be arranged in parallel flow with one another.

More specifically, still, for the embodiment depicted, the plurality of heat sink exchangers includes a first heat sink heat exchanger 108A operable with the fuel delivery system 120. More specifically, still, the first heat sink heat exchanger 108A, in addition to being in thermal communication with the thermal bus 102, is in thermal communication with the fuel delivery system 120 at a location downstream of the fuel oxygen conversion unit 132 of the fuel delivery system 120. For example, as will be appreciated, the thermal bus 102 may provide a relatively high temperature heat exchange fluid flow to the first heat sink heat exchanger 108A, and similarly, the one or more main fuel lines 128 of the fuel delivery system 120 may provide a relatively cool fuel flow to the first heat sink heat exchanger 108A. Heat from the relatively high temperature heat exchange fluid flow may transfer to the relatively cool fuel flow within the first heat sink heat exchanger 108A, decreasing a temperature of the heat exchange fluid flow and increasing a temperature of the fuel flow. The cooled heat exchange fluid flow may then be provided from the first heat sink heat exchanger 108A back to the thermal bus 102, and similarly, the heated fuel flow may then be provided back to the main fuel lines 128 of the fuel delivery system 120.

In such a manner, the thermal management system 100 may collect heat from the one or more heat source heat exchangers and provide such heat to the fuel delivery system 120 through the first heat sink heat exchanger 108A. Accordingly, when all systems are operating as intended, such a configuration may allow for an efficient transfer of heat from one or more systems of the gas turbine engine to the fuel.

It will be appreciated, however, that in the event of a decrease an operability, or a failure, of certain components, such as the fuel oxygen conversion unit 132, the transfer of heat to the fuel flow through the fuel delivery system 120 may result in damage to one or more systems of the gas turbine engine. For example, in the event of a failure of the fuel oxygen conversion unit 132, transfer of heat to the fuel flow may result in at least a portion of the fuel coking (see description above), which may clog up, e.g., the one or more fuel nozzles 122 of the fuel delivery system 120, the heat sink heat exchanger 108A, fuel filter and fuel valves (not shown), etc.

Accordingly, the present disclosure further includes a control system 150 for monitoring an operability of one or more components of the systems included herein and modifying operation of the systems if needed. More specifically, the exemplary control system 150 depicted generally includes a sensor, a valve, and a controller 152 operable with the sensor and the valve.

The sensor is operable with the fuel delivery system 120 for sensing data indicative of an operability of the fuel oxygen conversion unit 132. More specifically, for the embodiment depicted, the control system 150 further comprises a plurality of sensors operable with the fuel delivery system 120 for sensing data indicative of the operability of the fuel oxygen conversion unit 132. For example, in the embodiment depicted, the control system 150 includes a first sensor 154 and a second sensor 156. The first sensor 154 is a fuel oxygen conversion sensor for sensing data indicative of a parameter of the fuel oxygen conversion unit 132. For example, in at least certain embodiments, the parameter of the fuel oxygen conversion unit 132 may be at least one of a catalyst temperature of the fuel oxygen conversion unit 132 (e.g., a temperature of the catalyst 140; see FIG. 3) or a gas flow rate of the stripping gas of the fuel oxygen conversion unit 132 (e.g., a gas flow rate of the flow 144; see FIG. 3). As will be appreciated from the disclosure herein, each of the catalyst temperature and the gas flow rate of the stripping gas may indicate, e.g., an efficiency at which the fuel oxygen conversion unit 132 is operating (indirectly indicating how much oxygen is in the fuel flow). It should be appreciated, however, that in other embodiments, data indicative of any other suitable parameter of the fuel oxygen conversion unit 132 may be sensed to determine an operability of the fuel oxygen conversion unit 132.

Additionally, the second sensor 156 is, for the embodiment depicted, an oxygen sensor for sensing data indicative of an oxygen level in the fuel flow within the fuel delivery system 120 downstream of the fuel oxygen conversion unit 132. More specifically, the second sensor 156 is positioned downstream of the fuel oxygen conversion unit 132 and upstream of the heat sink heat exchanger. The second sensor 156 may directly sense data indicative of an oxygen level within the fuel flow through the main fuel lines 128 of the fuel delivery system 120 at such location (indirectly indicating an operability level of the fuel oxygen conversion unit 132).

In such a manner, the control system 150 may utilize redundant sensors for determining the operability of the fuel oxygen conversion unit 132 of the fuel delivery system 120. The redundant sensors may allow for the systems to continue operating despite a failure of one of the sensors. Additionally, or alternatively, the redundant sensors may allow for the control system 150 to determine a failure condition in the event that a failed sensor incorrectly registers, e.g., the fuel oxygen conversion unit 132 is operating as desired.

Additionally, as stated, the control system 150 includes the valve. The valve is operable with at least one of the fuel delivery system 120 or the thermal management system 100 for modifying at least one of a fuel flow through the fuel oxygen conversion unit 132, a fuel flow through the first heat sink heat exchanger 108A, a heat exchange fluid flow to/through the first heat sink heat exchanger 108A from the thermal bus 102, or a heat exchange fluid flow to/through the first heat source heat exchanger 106A from the thermal bus 102. More specifically, for the embodiment depicted, the control system 150 includes a plurality of valves operable as bypass valves, and a corresponding plurality of bypass lines for providing such functionality.

For example, the control system 150 includes a first bypass valve 158 operable with the fuel delivery system 120 at a location upstream of the fuel oxygen conversion unit 132 for diverting at least a portion of the fuel flow around the fuel oxygen conversion unit 132 to a location downstream of the fuel oxygen conversion unit 132. More specifically, the first bypass valve 158 is fluidly connected to a first bypass line 160 extending from the first bypass valve 158 to the main fuel lines 128 at a location downstream of the fuel oxygen conversion unit 132. Notably, the first bypass line 160 is, for the embodiment shown, merged with the main fuel lines 128 using a first three-way valve 162. Additionally, although not depicted, a one-way valve may be provided in the main fuel lines 128 at a location upstream of the first three-way valve 162 and downstream of the fuel oxygen conversion unit 132.

Additionally, the control system 150 includes a second bypass valve 164 operable with the fuel delivery system 120 at a location upstream of the first heat sink heat exchanger 108A (and downstream of the fuel oxygen conversion unit 132) for diverting at least a portion of the fuel flow around the first heat sink heat exchanger 108A to a location downstream of the first heat sink heat exchanger 108A. More specifically, the second bypass valve 164 is fluidly connected to a second bypass line 166 extending from the second bypass valve 164 to the main fuel lines 128 at a location downstream of the first heat sink heat exchanger 108A. Notably, the second bypass line 166 is, for the embodiment shown, merged with the main fuel lines 128 using a through a second three-way valve 168. Additionally, although not depicted, a one-way valve may be provided in the main fuel lines 128 at a location upstream of the second three-way valve 168 and downstream of the first heat sink heat exchanger 108A.

Further, the control system 150 includes a third bypass valve 170 operable with the thermal management system 100 at a location upstream of the first heat sink heat exchanger 108A (and downstream of the heat source heat exchanger(s) 106 and pump 104 for the embodiment shown) for diverting at least a portion of the heat exchange fluid flow around the first heat sink heat exchanger 108A to a location downstream of the first heat sink heat exchanger 108A. More specifically, the third bypass valve 170 is fluidly connected to a third bypass line 172 extending from the third bypass valve 170 to the thermal bus 102 at a location downstream of the first heat sink heat exchanger 108A. Notably, the third bypass line 172 is, for the embodiment shown, merged with the thermal bus 102 using a third three-way valve 174. Additionally, although not depicted, a one-way valve may be provided in the thermal bus 102 at a location upstream of the third three-way valve 174 and downstream of the first heat sink heat exchanger 108A.

Further, still, the control system 150 includes a fourth bypass valve 176 operable with the thermal management system 100 at a location upstream of the first heat source heat exchanger 106A (and downstream of the heat sink heat exchanger(s) 106 for the embodiment shown) for diverting at least a portion of the heat exchange fluid flow around the first heat source heat exchanger 106A to a location downstream of the first heat source heat exchanger 106A. More specifically, the fourth bypass valve 176 is fluidly connected to a fourth bypass line 178 extending from the fourth bypass valve 176 to the thermal bus 102 at a location downstream of the first heat source heat exchanger 106A. Notably, the fourth bypass line 178 is, for the embodiment shown, merged with the thermal bus 102 using a through a fourth three-way valve 180. Additionally, although not depicted, a one-way valve may be provided in the thermal bus 102 at a location upstream of the fourth three-way valve 180 and downstream of the first heat source heat exchanger 106A.

It will further be appreciated that, for the embodiment depicted, the control system 150 further comprises a fifth bypass valve 182 and fifth bypass line 184 operable to divert at least a portion of the heat exchange fluid flow through the thermal bus 102 around the second heat source heat exchanger 106B, as well as a sixth bypass valve 186 and sixth bypass line 188 operable to divert at least a portion of the heat exchange fluid flow through the thermal bus 102 around the second heat sink heat exchanger 108B. These bypass valves 182, 186 and bypass lines 184, 188 may operate in a similar manner to the bypass valves and bypass lines described above.

It will be appreciated that in at least certain exemplary embodiments, each of the first bypass valve 158 and the second bypass valve 164 may generally be configured for providing anywhere between zero percent (0%) and one hundred percent (100%) of the fuel flow through the main fuel line 128 upstream of the fuel oxygen conversion unit 132 and first heat sink heat exchanger 108A, respectively, to the first bypass line 160 or the second bypass line 166, respectively. Similarly, each of the third bypass valve 170 and fourth bypass valve 176 may generally be configured for providing anywhere between zero percent (0%) and one hundred percent (100%) of the heat exchange fluid flow through the thermal bus 102 upstream of the first heat sink heat exchanger 108A and the first heat source heat exchanger 106A, respectively, to the third bypass line 172 or the fourth bypass line 178, respectively. Additionally, each of the three-way valves may generally include a first inlet and an outlet fluidly connected to the main fuel lines 128 or thermal bus 102, as appropriate, as well as a second inlet fluidly connected to the respective bypass line.

As is also depicted, and as is noted above, the control system 150 further includes the controller 152 operable with the sensor and the valve. It will be appreciated that in certain embodiments, the controller 152 may be a stand-alone, dedicated controller 152 for the control system 150. Alternatively, however, in other embodiments, the controller 152 may be integrated into, or otherwise combined with, any other controller of the gas turbine engine or aircraft including the gas turbine engine. For example, in at least certain exemplary aspects, the controller 152 may be included as part of an overall engine controller for the gas turbine engine, such as a Full Authority Digital Engine Controller (also referred to as a "FADEC").

Additionally, and more specifically for the embodiment depicted, the controller 152 is operable with the plurality of sensors 154, 156 and the plurality of bypass valves 158, 164, 170, 176, 182, 186. For example, in certain embodiments, the controller 152 may be in operable communication with the plurality of sensors and the plurality of bypass valves through one or more wired or wireless communications busses (generally, 190; depicted in phantom). Additionally, the controller 152 is configured to receive data from the sensor (or plurality of sensors) and, if necessary, to initiate a corrective action based on the received data sensed by the sensor (or plurality of sensors) indicative of the operability of the fuel oxygen conversion unit 132 of the fuel delivery system 120.

More specifically, for the embodiment depicted, initiating the corrective action may include operating the valve (or plurality of bypass valves) based at least in part on the data received from the sensor (or the plurality of sensors). Accordingly, the controller 152 may determine when to bypass the fuel flow from, e.g., the fuel oxygen conversion unit 132 and/or the first heat sink heat exchanger 108A based on data sensed by one or more of the plurality of sensors indicative of the operability of the fuel oxygen conversion unit 132. Similarly, the controller 152 may determine when to bypass the heat exchange fluid flow from one or more of the first heat sink heat exchanger 108A, first heat source heat exchanger 106A, and second heat source heat exchanger 106B also based on data sensed by one or more of the plurality of sensors indicative of the operability of the fuel oxygen conversion unit 132.

Notably, the control system 150 further comprises a first thermal management system sensor 192 and a second thermal management system sensor 194. The first thermal management sensor 192 may sense data indicative of a temperature of heat exchange fluid flow through the thermal bus 102 and the second thermal management system sensor 194 may sense data indicative of a pressure of the heat exchange fluid flow through the thermal bus 102. In such a manner, the controller 152 may further determine how much heat will be transferred to the fuel flow through the first heat sink heat exchanger 108A, which may influence one or more control decisions of the controller 152, such as whether or not, and/or to what extent, to bypass some or all of the heat exchange fluid flow around the first heat sink heat exchanger 108A, the first heat source heat exchanger 106A, and/or the second heat source heat exchanger 106B.

For example, in an exemplary aspect of this disclosure, the controller 152 may receive data from one or more of the sensors 154, 156 indicative of an operability of the fuel oxygen conversion unit 132 being below a desired operability level. Such may indicate that the fuel provided by the fuel delivery system 120 to the combustion section of the engine 10 includes a higher level of oxygen than desired. In response, the controller 152 may initiate a corrective action, which for the embodiment of FIG. 2 may include reducing an amount of heat transferred to the fuel flow through the fuel delivery system 120. For example, the controller 152 may bypass some or all of a heat exchange fluid flow through the thermal transport bus 102 around the first heat sink heat exchanger 108A using valve 170; may bypass some or all of the heat exchange fluid flow through the thermal transport bus 102 around one or both of the heat source heat exchangers 106A, 106B using valves 176, 182 (respectively); or may bypass some or all of a fuel flow through the main fuel lines 128 around the first heat sink heat exchanger 108A using valve 164.

It should be appreciated, however, that in other exemplary embodiments, the thermal management system 100, fuel delivery system 120, and/or control system 150 may be configured in any other suitable manner for protecting the fuel delivery system 120. For example, in other exemplary embodiments, the thermal transport assembly may not be a thermal transport bus 102 having an intermediate heat exchange fluid flowing therethrough, and instead the thermal transport assembly may have any other configuration for providing a fluid (whether liquid or gas) to, e.g., the heat sink heat exchanger 108. For example, the thermal transport assembly may be an airflow duct. Additionally, in other exemplary embodiments, the controller 150 may initiate any other suitable corrective action in response to the received data from the one or more sensors indicative of the operability of the fuel oxygen conversion unit 132 (or other oxygen reduction unit, if provided). For example, in other exemplary aspects, the controller 150 may reduce a thrust output of the engine 10 (in turn reducing an amount of heat generated by the one or more accessory systems thermally coupled to the thermal management system 100); may initiate an engine shut-down (again reducing an amount of heat generated by the one or more accessory systems thermally coupled to the thermal management system 100); or may simply provide an indication to a user (such as a pilot or maintenance personnel) indicative of the health of the fuel delivery system 120 (which may prompt such person to operate the engine in a less power-intensive manner, take the engine/ aircraft in for maintenance operations, etc.).

In such a manner, the gas turbine engine may operate more efficiently, with less risk of transferring excess heat to the fuel flow through the fuel management system in the event of a decreased operability of the fuel oxygen conversion unit 132, which may lead to system damage.

Figure 4:
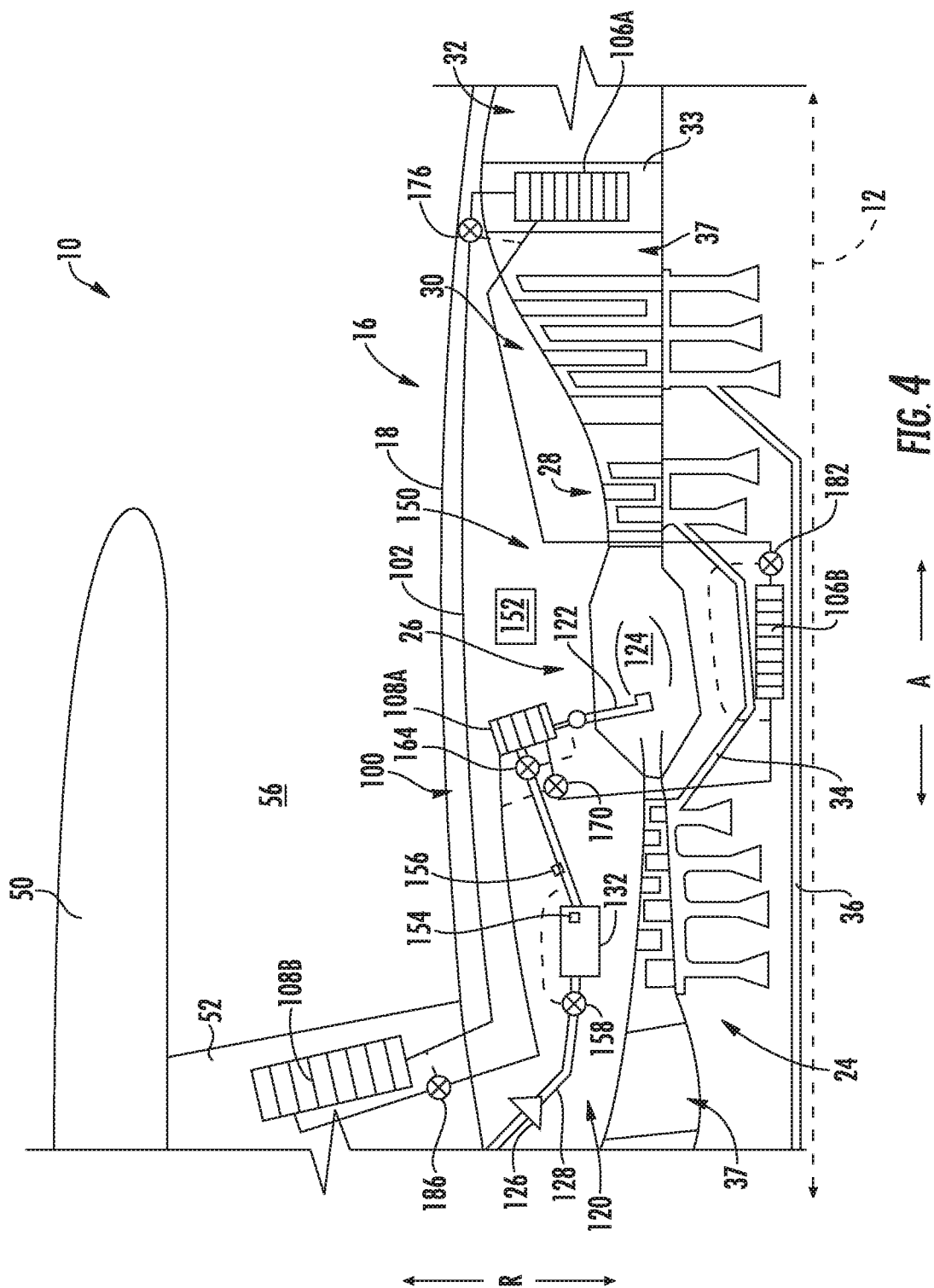
FIG. 4 is a schematic, cross-sectional view of a section of a gas turbine engine including a thermal management system in accordance with an exemplary embodiment of the present disclosure.

Referring now to FIG. 4, a close-up, cross-sectional view of one specific embodiment is provided of a gas turbine engine including a thermal management system 100 and fuel delivery system 120 in accordance with an exemplary aspect of the present disclosure. The gas turbine engine may be configured in a similar manner to the exemplary turbofan engine 10 described above with reference to FIG. 1, and further, the thermal management system 100 and fuel delivery system 120 may each be configured in a similar manner to the exemplary thermal management system 100 and fuel delivery system 120 described above with reference to FIG. 2. Accordingly, the same or similar numbers may refer to same or similar parts.

For example, as is depicted the exemplary gas turbine engine of FIG. 4 generally includes a turbomachine 16 and an outer nacelle 50, with the turbomachine 16 at least partially surrounded by the outer nacelle 50. Moreover, the outer nacelle 50 defines a bypass airflow passage 56 with the turbomachine 16 (i.e., between the outer nacelle 50 and the turbomachine 16), and more specifically, defines the bypass airflow passage 56 between the outer nacelle 50 and an outer casing 18 of the turbomachine 16. Furthermore, the gas turbine engine includes an outlet guide vane 52 extending between the outer nacelle 50 and the turbomachine 16, the outlet guide vane 52 supporting the turbomachine 16 relative to the outer nacelle 50.

In such a manner, the gas turbine engine may be referred to as a turbofan engine (similar to the exemplary turbofan engine 10 of FIG. 1). Further, it will be appreciated from FIG. 4, and the discussion above with reference to FIG. 1, that the gas turbine engine may further define a relatively high bypass ratio, and therefore may be referred to as a "high-bypass" turbofan engine.

Referring still to FIG. 4, the exemplary turbomachine 16 depicted generally includes a compressor section, a combustion section 26, a turbine section, and an exhaust section 32. The compressor section, combustion section 26, turbine section, and exhaust section 32 together define at least in part a core air flowpath 37. Additionally, the compressor section generally includes a high pressure ("HP") compressor 24, and the turbine section generally includes a low pressure ("LP") turbine 30 and an HP turbine 28. The LP turbine 30 is coupled to, and configured to drive, an LP spool 36, and the HP turbine 28 is coupled to and configured to drive, an HP spool 34. Notably, the HP spool 34 is further coupled to the HP compressor 24, such that the HP turbine 28 may drive the HP compressor 24 through the HP spool 34.

The turbomachine 16 further includes a fuel delivery system 120 for providing a fuel flow to the combustion section 26 of the turbomachine 16. For example, the exemplary fuel delivery system 120 generally includes one or more fuel nozzles 122 configured to provide a mixture of fuel and air to a combustion chamber 124 of the combustion section 26, as well as a fuel pump 126 and a plurality of fuel lines 128. The fuel pump 126 may provide for the fuel flow through the plurality of fuel lines 128 from a fuel source (not shown) to the plurality of fuel nozzles 122.

Further, it will be appreciated from the discussion above that for the embodiment depicted the fuel delivery system 120 is used as a heat sink. Accordingly, the exemplary fuel delivery system 120 of FIG. 4 further includes a fuel oxygen conversion unit 132 for reducing a level of oxygen within the fuel flow through fuel delivery system 120. The reduction in oxygen in the fuel flow may, e.g., reduce a risk of particulate formation within the fuel flow when exposed to relatively high temperatures, also referred to as "coking."

Moreover, the exemplary gas turbine engine depicted includes a thermal management system 100. In at least certain exemplary embodiments, the thermal management system 100 of the gas turbine engine of FIG. 4 may be configured in a similar manner as the exemplary thermal management system 100 described above with reference to FIG. 2. For example, the thermal management system 100 generally includes a heat source heat exchanger 106 configured to collect heat from the turbomachine during operation, a heat sink heat exchanger 108 configured to reject heat during operation, and a thermal transport bus 102. The thermal transport bus 102 includes a heat exchange fluid configured to flow therethrough at an operational pressure during operation. The heat source heat exchanger 106 and heat sink heat exchanger 108 are each fluidly coupled to the thermal transport bus 102 (and more specifically, thermally coupled to the heat exchange fluid flow through the thermal transport bus 102) such that the heat source heat exchanger 106 is operable to transfer heat to the heat exchange fluid and the heat sink heat exchanger 108 is operable to transfer heat from the heat exchange fluid.

More specifically, for the embodiment depicted, the heat source heat exchanger 106 is a first heat source heat exchanger 106A, and the thermal management system 100 further includes a second heat source heat exchanger 106B. The first heat source heat exchanger 106A is, for the embodiment shown, a waste heat recovery heat exchanger. More specifically, for the embodiment depicted, the waste heat recovery heat exchanger is positioned to be in thermal communication with the core air flowpath 37 within or downstream of, the turbine section, the exhaust section 32, or both. More specifically, still, for the embodiment depicted, the waste heat recovery heat exchanger is integrated into an aft strut 33 extending through an aft end of the turbine section of the turbomachine 16. Accordingly, the waste heat recovery heat exchanger may generally capture heat from the flow of gases through an aft portion of the turbine section and/or from a flow of exhaust through the exhaust section.

Further, for the embodiment depicted, the second heat source heat exchanger 106B is configured as a cooled cooling air heat exchanger operable with a CCA system 80 of the gas turbine engine (see also CCA system 80 of FIG. 1). As will be appreciated, the CCA system 80 may generally provide an airflow 146 from the compressor section to the turbine section, with such airflow 146 being used as cooling air for the turbine section. The cooled cooling air heat exchanger may remove heat from the airflow 146 from the compressor section prior to such airflow 146 being provided to the turbine section. In such a manner, the cooled cooling air heat exchanger may reduce a temperature of the airflow 146 being provided to the turbine section, such that the airflow 146 may act more efficiently as cooling air.

Also for the embodiment depicted, the first heat sink heat exchanger 108A is a fuel heat exchanger thermally coupled to the fuel delivery system 120. More specifically, the fuel heat exchanger is thermally coupled to one of the plurality of main fuel lines 128 of the fuel delivery system 120 such that the fuel heat exchanger may reject heat to a fuel flow therethrough.

Moreover, for the embodiment depicted, the second heat sink heat exchanger 108B is a bypass airflow heat exchanger integrated into, or coupled to, one or more components positioned in, or otherwise exposed to, the bypass airflow passage. More specifically, for the embodiment depicted, the bypass airflow heat exchanger is integrated into, or coupled to, the outlet guide vane 52 of the gas turbine engine within the bypass airflow passage 56. In such a manner, the bypass airflow heat exchanger may reject heat to the airflow through the bypass airflow passage 56 during operation.

It should be appreciated, however, that in other exemplary embodiments, the thermal management system 100 may be configured in any other suitable manner. For example, in other embodiments, the thermal management system 100 may include any other suitable number or type of heat source heat exchangers 106, as well as any other suitable number or type of heat sink heat exchangers 108. Further, the thermal management system 100 may also be integrated into, or utilized with, any other suitable gas turbine engine.

Referring still to FIG. 4, the exemplary gas turbine engine depicted further includes a control system 150. The control system 150 generally includes a sensor, a valve, and a controller 152 operable with the sensor and the valve. More specifically, as depicted schematically, the control system 150 includes a plurality of sensors operable with the fuel delivery system 120 for sensing data indicative of and operability of the fuel oxygen conversion unit 132. For example, in the embodiment depicted, the control system 150 includes a first sensor 154 operable with the fuel oxygen conversion unit 132 for sensing one or more parameters of the fuel oxygen conversion unit 132 indicative of its operability, as well as a second sensor 156 operable with the main fuel lines 128 for sensing an oxygen level of the fuel flow through the main fuel lines 128 at a location downstream of the fuel oxygen conversion unit 132 and upstream of the fuel heat exchanger (i.e., the first heat sink heat exchanger 108A).

Further, for the embodiment depicted, the control system 150 includes a plurality of valves, the valves operable with at least one of the fuel delivery system 120 or the thermal management system 100 for modifying at least one of a fuel flow through the fuel oxygen conversion unit 132, a fuel flow through the fuel heat exchanger, a heat exchange fluid flow through the fuel heat exchanger, or a heat exchange fluid flow through one or both of the first heat source heat exchanger 106A or the second heat source heat exchanger 106B. More specifically, the plurality of valves includes a plurality bypass valves. The plurality bypass valves include a first bypass valve 158 operable to divert the fuel flow through the main fuel lines 128 of the fuel delivery system 120 around the fuel oxygen conversion unit 132, a second bypass valve 164 operable to divert the fuel flow through the main fuel lines 128 of the fuel delivery system 120 around the fuel heat exchanger, a third bypass valve 170 operable to divert the heat exchange fluid flow through the thermal bus 102 around the fuel heat exchanger, a fourth bypass valve 176 operable to divert heat exchange fluid flow through the thermal bus 102 around the waste heat recovery heat exchanger, a fifth bypass valve 182 operable to divert heat exchange fluid flow through the thermal bus 102 around the cooled cooling air heat exchanger, and a sixth bypass valve 186 operable to divert heat exchange fluid flow through the thermal bus 102 around the bypass airflow passage heat exchanger. The bypass lines operable with these bypass valves are depicted in phantom (see also FIG. 2).

Figure 5:
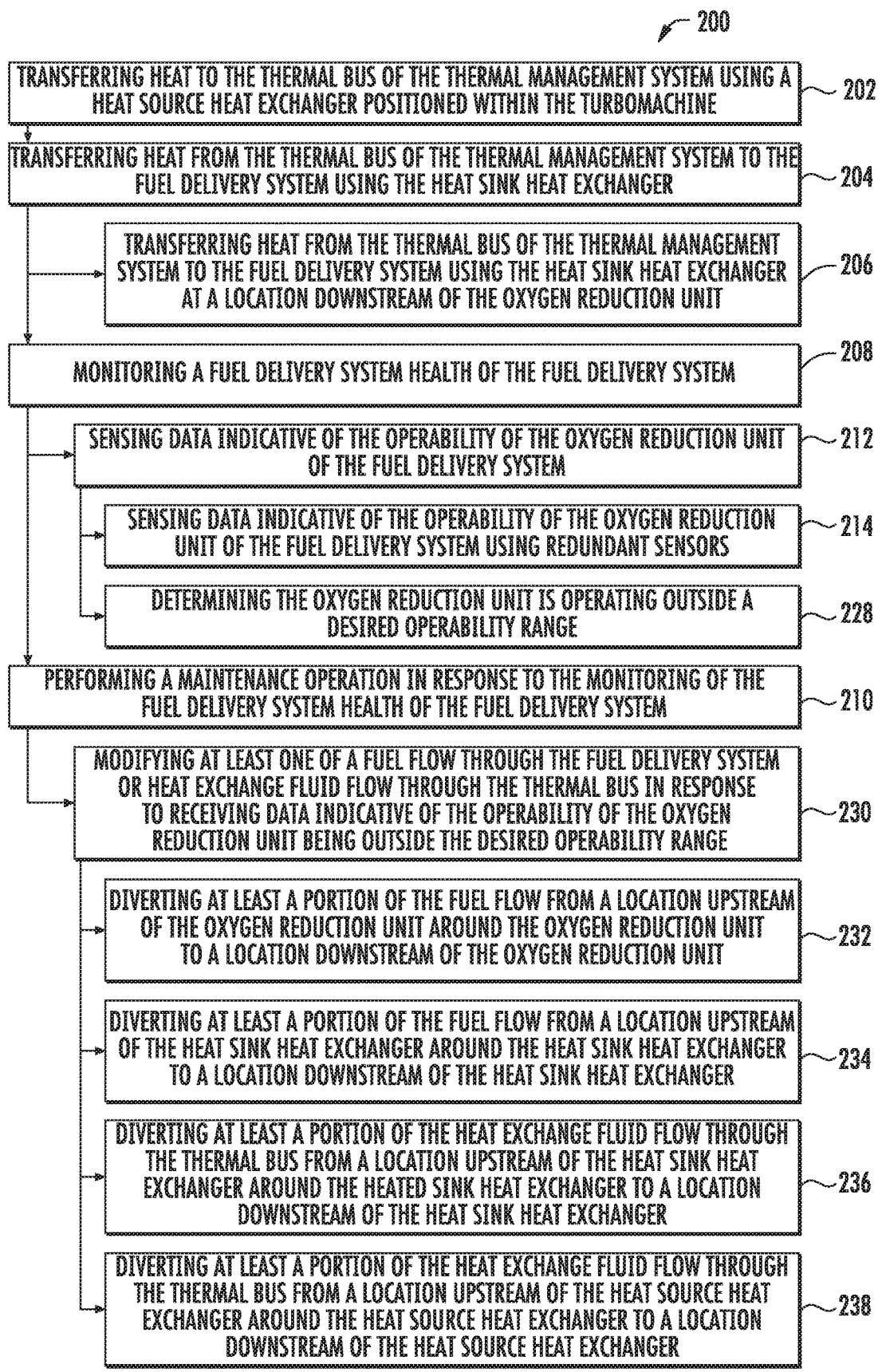
FIG. 5 is a flow diagram of a method for operating a gas turbine engine in accordance with an exemplary aspect of the present disclosure.

Referring now to FIG. 5, a flow diagram of a method 200 for operating a gas turbine engine in accordance with an exemplary aspect of the present disclosure is depicted. The exemplary method 200 may be utilized with one or more the exemplary embodiments described above with reference to FIGS. 1 through 4. Accordingly, the gas turbine engine may generally include a turbomachine, a fuel delivery system for providing fuel to a combustion section of the turbomachine, and a thermal management system having a thermal bus and a heat sink heat exchanger in thermal communication with the thermal bus and the fuel delivery system.

As is depicted, the method 200 generally includes at (202) transferring heat to the thermal bus of the thermal management system using a heat source heat exchanger positioned within the turbomachine. For example, in certain exemplary aspects, transferring heat to the thermal bus of the thermal management system at (202) may include transferring heat to the thermal bus of the thermal management system using, e.g., a waste the recovery heat exchanger, a cooled cooling air heat exchanger, etc.

Additionally, the exemplary method 200 includes transferring heat to the fuel delivery system using the heat sink heat exchanger, and more specifically, for the exemplary aspect of the method 200 depicted includes at (204) transferring heat from the thermal bus of the thermal management system to the fuel delivery system using the heat sink heat exchanger. As will be appreciated, the exemplary fuel delivery system generally includes an oxygen reduction unit for reducing an oxygen level within the fuel flow through the fuel delivery system. For the embodiment depicted, transferring heat from the thermal bus of the thermal management system to the fuel delivery system using the heat sink heat exchanger at (204) includes at (206) transferring heat from the thermal bus of the thermal management system to the fuel delivery system using the heat sink heat exchanger at a location downstream of the oxygen reduction unit. In such a manner, the method 200 may transfer heat from one or more heat sources to the fuel flow through the fuel delivery system using the thermal bus and heat source and heat sink heat exchangers.

In addition, for the exemplary aspect depicted in FIG. 5, the method 200 further includes at (208) monitoring a fuel delivery system health of the fuel delivery system, with the fuel delivery system health being indicative of an operability of the oxygen reduction unit of the fuel delivery system. (As noted above, the oxygen reduction unit of the fuel delivery system is positioned upstream of the heat sink heat exchanger within the fuel delivery system.) Further, the method 200 of FIG. 5 includes at (210) performing a maintenance operation in response to the monitoring of the fuel delivery system health of the fuel delivery system at (208).

More specifically, for the exemplary aspect depicted, monitoring the fuel delivery system health at (208) includes at (212) sensing data indicative of the operability of the oxygen reduction unit of the fuel delivery system. More specifically, still, sensing data indicative of the operability of the oxygen reduction unit of the fuel delivery system at (212) includes at (214) sensing data indicative of the operability of the oxygen reduction unit of the fuel delivery system using redundant sensors.

Figure 6:
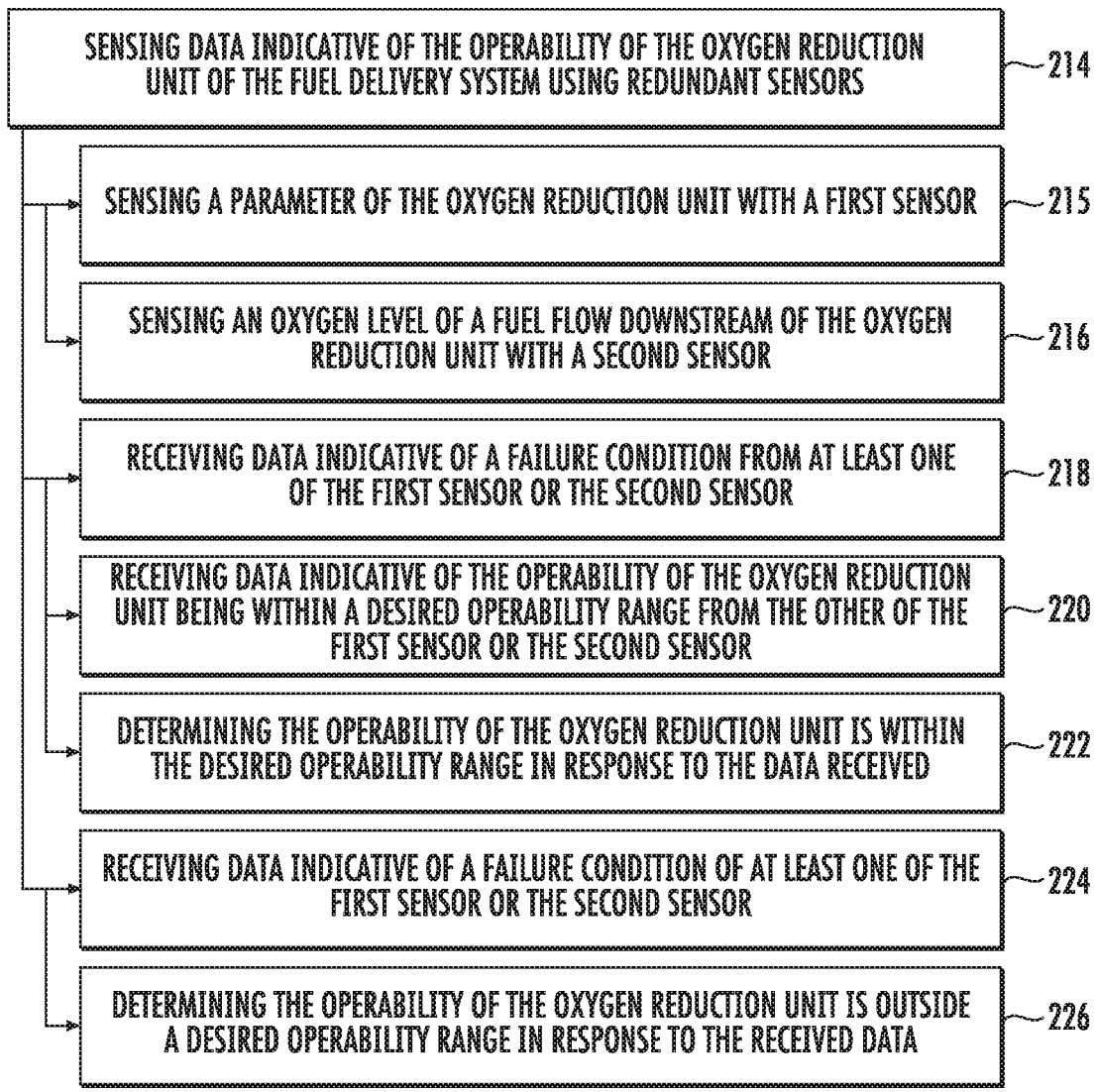
FIG. 6 is a flow diagram of a method for sensing data indicative of an operability of an oxygen reduction unit in accordance with an exemplary aspect of the present disclosure.

Referring now briefly to FIG. 6, various exemplary aspects of the present disclosure are depicted, and more specifically, various exemplary aspects of the sensing of data indicative of the operability of the oxygen reduction unit of the fuel delivery system using redundant sensors at (214) are depicted. As shown, for example, in certain exemplary aspects, sensing data indicative of the operability of the oxygen reduction unit of the fuel delivery system using redundant sensors at (214) includes at (215) sensing a parameter of the oxygen reduction unit with a first sensor and at (216) sensing an oxygen level of a fuel flow downstream of the oxygen reduction unit with a second sensor.

Accordingly, it will be appreciated that by sensing data indicative of the operability of the oxygen reduction unit using redundant sensors, the method 200 may allow for the gas turbine engine to continue operating relatively efficiently (i.e., utilizing the fuel delivery system is a heat sink) despite a failure of one of the first sensor or the second sensor. For example, as is depicted in phantom, in at least certain exemplary aspects, sensing data indicative of the operability of the oxygen reduction unit using redundant sensors at (214) may further include at (218) receiving data indicative of a failure condition from at least one of the first sensor or the second sensor, at (220) receiving data indicative of the operability of the oxygen reduction unit being within a desired operability range from the other of the first sensor or the second sensor, and at (222) determining the operability of the oxygen reduction unit is within the desired operability range in response to the data received at (218) and at (220). For example, the data indicative of the failure condition received from at least one of the first sensor or the second sensor received at (218) may be data indicative of the oxygen reduction unit operating outside a desired operability range, or alternatively may be data indicative of a failure condition of the sensor. In such a manner, the system a continue utilizing the fuel delivery system as a heat sink, despite a sensor failure.

Alternatively, however, it should be appreciated that in other exemplary aspects, the method 200 may utilize the redundant sensors to operate in a more conservative manner. For example, in certain exemplary aspects, as is depicted in phantom, sensing data indicative of the operability of the oxygen reduction unit using redundant sensors at (214) may include at (224) receiving data indicative of a failure condition of at least one of the first sensor or the second sensor, and at (226) determining the operability of the oxygen reduction unit is outside a desired operability range in response to the received data at (224). In such a manner, the method 200 may minimize a risk of damage to the gas turbine engine during operation.

Referring now back to FIG. 5, will be appreciated that for the embodiment depicted, sensing data indicative of the operability of the oxygen reduction unit at (212), whether through one sensor, two sensors, or any other suitable number of sensors, includes at (228) determining the oxygen reduction unit is operating outside a desired operability range. Notably, when the oxygen reduction unit is operating outside the desired operability range, the oxygen reduction unit may not be removing a desired amount of oxygen from the fuel flow within/through the fuel delivery system, such that the risk of the fuel coking upon receipt of heat through the heat sink heat exchanger is undesirably high.

For the exemplary aspect of the method 200 depicted in FIG. 5, performing the maintenance operation at (210) includes at (230) modifying at least one of a fuel flow through the fuel delivery system or heat exchange fluid flow through the thermal bus in response to receiving data indicative of the operability of the oxygen reduction unit being outside the desired operability range at (228).

For example, in at least certain exemplary aspects, modifying at least one of the fuel flow through the fuel delivery system or the heat exchange fluid through the thermal bus at (230) may include at (232) diverting at least a portion of the fuel flow from a location upstream of the oxygen reduction unit around the oxygen reduction unit to a location downstream of the oxygen reduction unit. Such may allow for the fuel flow to bypass the oxygen reduction unit when the received data indicates the oxygen reduction unit is no longer operating as desired.

Additionally, or alternatively, in certain exemplary aspects, modifying at least one of the fuel flow through the fuel delivery system or the heat exchange fluid through the thermal bus at (230) may further include at (234) diverting at least a portion of the fuel flow from a location upstream of the heat sink heat exchanger around the heat sink heat exchanger to a location downstream of the heat sink heat exchanger. Such may ensure that the fuel flow does not accept an amount of heat from the thermal management system which may put the fuel flow at a relatively high risk of coking the event the oxygen reduction unit is not operating as desired. Notably, in certain exemplary aspects, diverting at least a portion of the fuel flow at (234) may include diverting substantially all of the fuel flow, or alternatively, may include diverting a portion of the fuel flow (such as between about ten percent and ninety percent, such as between about twenty-five percent and seventy-five percent).

Additionally, or alternatively, still, in certain exemplary aspects, modifying at least one of the fuel flow through the fuel delivery system or the heat exchange fluid through the thermal bus at (230) may further include at (236) diverting at least a portion of the heat exchange fluid flow through the thermal bus from a location upstream of the heat sink heat exchanger around the heated sink heat exchanger to a location downstream of the heat sink heat exchanger, and/or at (238) diverting at least a portion of the heat exchange fluid flow through the thermal bus from a location upstream of the heat source heat exchanger around the heat source heat exchanger to a location downstream of the heat source heat exchanger.

It will be appreciated that diverting the heat exchange fluid flow around the heat sink heat exchanger may ensure the fuel flow does not accept an amount of heat from the thermal management system which may put the fuel flow at a relatively high risk of coking the event the oxygen reduction unit is not operating as desired. Similarly, it will be appreciated that diverting the heat exchange fluid flow around the heat source heat exchanger may reduce an amount of heat added to the exchange fluid flow, similarly ensuring that the fuel flow does not accept an amount of heat from the thermal management system which may put the fuel flow at a relatively high risk of coking the event the oxygen reduction unit is not operating as desired.

Notably, with each of these exemplary aspects, diverting at least a portion of the heat exchange fluid flow at (236) and/or at (238) may include diverting substantially all of the heat exchange fluid flow, or alternatively, may include diverting a portion of the fuel flow (such as between about ten percent and ninety percent, such as between about twenty-five percent and seventy-five percent).

It will be appreciated that in at least certain exemplary aspects, the one or more sensors used to since data indicative of the operability of the oxygen reduction unit may be configured as part of a control system of the gas turbine engine. Additionally, it will be appreciated that in at least certain exemplary aspects, modification at (230) of at least one of the fuel flow through the fuel delivery system or the heat exchange fluid flow through the thermal bus in response to the data received indicative the operability of the oxygen reduction unit may be accomplished using one or more bypass valves and bypass lines (see, e.g., FIG. 2). The one or more bypass valves may also be configured as part of the control system of the gas turbine engine. In such a manner, a controller of the control system may receive the data from the one or more sensors, and based on that data operate the bypass valves in accordance with one or more the exemplary aspects described herein.

It will be appreciated, however, that in other exemplary aspects, the method 200 for operating the gas turbine engine may not include real-time monitoring of the data indicative of the operability of the oxygen reduction unit and corresponding real-time control of one or both of the thermal management system and the fuel delivery system.

Figure 7:
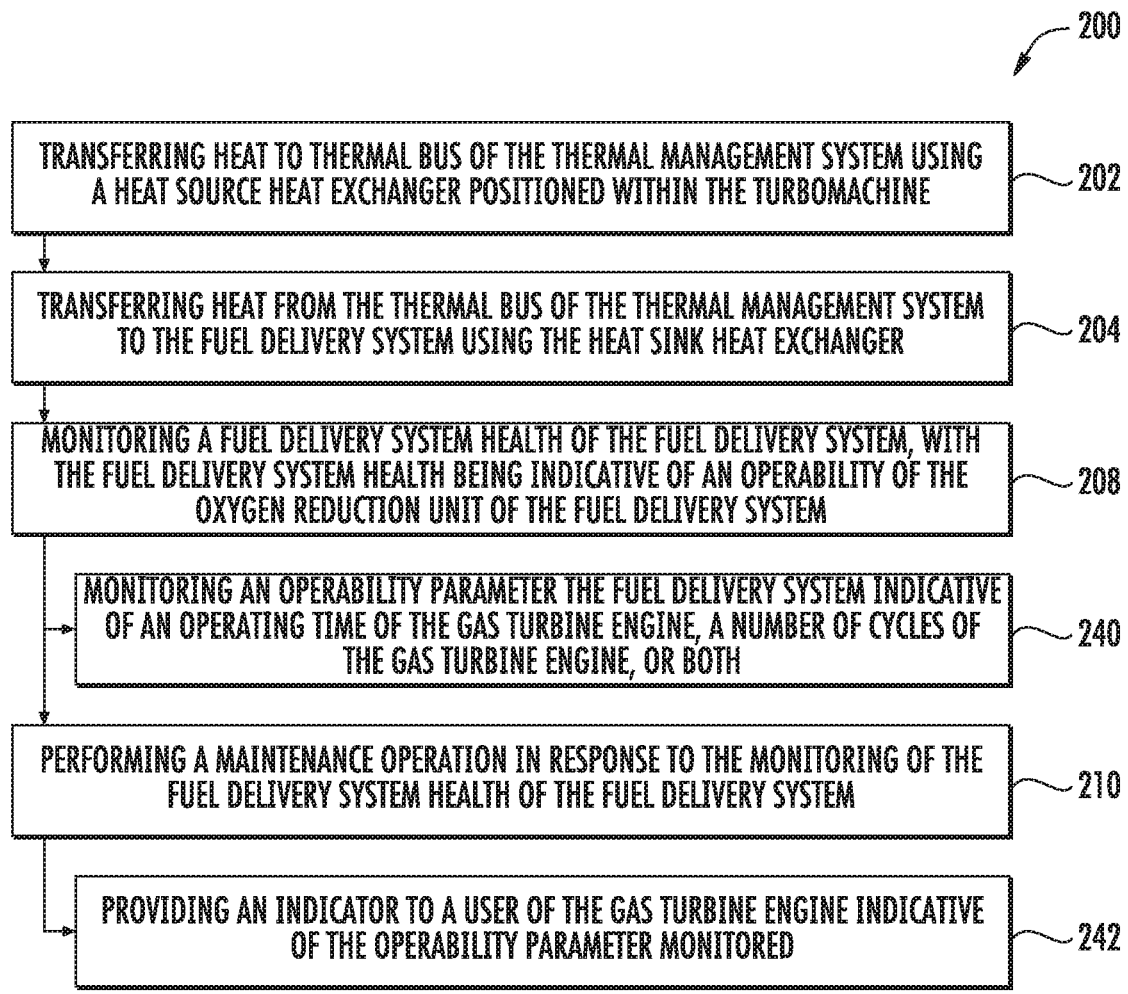
FIG. 7 is a flow diagram of a method for operating a gas turbine engine in accordance with another exemplary aspect of the present disclosure.

For example, referring now to FIG. 7, a method 200 for operating a gas turbine engine in accordance with another exemplary aspect of the present disclosure is provided. The exemplary method 200 of FIG. 6 may be similar to the exemplary method 200 of FIG. 5.

For example, the exemplary method 200 of FIG. 7 generally includes at (202) transferring heat to thermal bus of the thermal management system using a heat source heat exchanger positioned within the turbomachine. Additionally, the method 200 includes at (204) transferring heat from the thermal bus of the thermal management system to the fuel delivery system using the heat sink heat exchanger. Moreover, the method 200 includes at (208) monitoring a fuel delivery system health of the fuel delivery system, with the fuel delivery system health being indicative of an operability of the oxygen reduction unit of the fuel delivery system. As noted above, the oxygen reduction unit of the fuel delivery system is positioned upstream of the heat sink heat exchanger within the fuel delivery system. Further, the method 200 of FIG. 6 includes at (210) performing a maintenance operation in response to the monitoring of the fuel delivery system health of the fuel delivery system at (208).

More specifically, however, for the exemplary aspect depicted, monitoring the fuel delivery system health of the fuel delivery system at (208) includes at (240) monitoring an operability parameter the fuel delivery system indicative of an operating time of the gas turbine engine, a number of cycles of the gas turbine engine, or both. Further, for the exemplary aspect of FIG. 7, performing the maintenance operation in response to monitoring the fuel delivery system health of the fuel delivery system at (210) includes at (242) providing an indicator to a user of the gas turbine engine indicative of the operability parameter monitored at (240).

In such a manner, the exemplary method 200 may monitor a health of the fuel delivery system without requiring continuous monitoring of various sensors. For example, it may be determined that the gas turbine engine may operate in a desired manner (e.g., the oxygen reduction unit may operate within a desired operability range) for a minimum number of cycles and/or a minimum time one wing before a risk of the oxygen reduction unit failing or having a significant deterioration in operability increases significantly. In such a case, monitoring the fuel delivery system health in accordance with the exemplary aspect of FIG. 7 may allow for such monitoring without utilization of unnecessary resources.

It will be appreciated that the exemplary systems and methods described above with reference to FIGS. 1 through 7 generally relate to a fuel delivery system, a thermal management system, and a control system for incorporation into a gas turbine engine, such as an aeronautical gas turbine engine (e.g., a turbofan engine, turboprop engine, turbojet engine, etc.). However, in other exemplary embodiments and aspects of the present disclosure, the fuel delivery system, the thermal management system, and the control system may instead be configured for incorporation into any other suitable combustion engine, such as an aeroderivative gas turbine engine, a power generation gas turbine engine, an internal combustion engine, etc. For example, in certain exemplary embodiments, the fuel delivery system, thermal management system, and control system may instead be incorporated into internal combustion engines used in the automotive industry, agricultural industry, power generation industry, nautical industry, or any other suitable field.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustion engine comprising:
   a combustion section;
   a fuel delivery system configured to provide a fuel flow to the combustion section, the fuel delivery system comprising an oxygen reduction unit configured to reduce an oxygen content of the fuel flow, the oxygen reduction unit comprising a contactor, a separator and a catalyst, the catalyst positioned in a recirculation loop in fluid communication with each the separator and the contactor, wherein the catalyst is supplied a separated gas flow from the separator and the contactor is supplied a flow from the catalyst;
   a thermal management system comprising a heat sink heat exchanger, the heat sink heat exchanger in thermal communication with the fuel delivery system at a location downstream of the oxygen reduction unit; and
   a control system comprising a sensor operable with the fuel delivery system for sensing data indicative of an operability of the oxygen reduction unit and a controller operable with the sensor, the controller configured to initiate a corrective action based on the data sensed by the sensor indicative of the operability of the oxygen reduction unit, wherein the data sensed is data indicative of a temperature of the catalyst of the oxygen reduction unit, the catalyst operable to reduce or assist with reducing the oxygen content of the fuel flow, the temperature of the catalyst indicative of the operability of the oxygen reduction unit, or data indicative of a flow rate from the catalyst of the oxygen reduction unit, the flow rate from the catalyst indicative of the operability of the oxygen reduction unit.

2. The combustion engine of claim 1, wherein the control system further comprises a valve operable with at least one of the fuel delivery system or the thermal management system for modifying at least one of the fuel flow through the fuel delivery system or a heat exchange fluid flow through the thermal management system, and wherein initiating the corrective action comprises operating the valve based at least in part on the data received from the sensor.

3. The combustion engine of claim 2, wherein the thermal management system further comprises a thermal transport bus in thermal communication with the heat sink heat exchanger and a heat source heat exchanger in thermal communication with the thermal transport bus, and wherein the valve is operable with at least one of the fuel delivery system or the thermal management system for modifying at least one of the fuel flow through the oxygen reduction unit, the fuel flow through the heat sink heat exchanger, the heat exchange fluid flow through the heat sink heat exchanger, or the heat exchange fluid flow through the heat source heat exchanger.

4. The combustion engine of claim 2, wherein the thermal management system further comprises a thermal transport bus in thermal communication with the heat sink heat exchanger, wherein the valve is a bypass valve operable with the thermal transport bus of the thermal management system at a location upstream of the heat sink heat exchanger for diverting at least a portion of the heat exchange fluid flow within the thermal transport bus around the heat sink heat exchanger to a location downstream of the heat sink heat exchanger.

5. The combustion engine of claim 2, wherein the thermal management system further comprises a thermal transport bus in thermal communication with the heat sink heat exchanger and a heat source heat exchanger in thermal communication with the thermal transport bus, wherein the valve is a bypass valve operable with the thermal transport bus of the thermal management system at a location upstream of the heat source heat exchanger for diverting at least a portion of the heat exchange fluid within the thermal transport bus around the heat source heat exchanger to a location downstream of the heat source heat exchanger.

6. The combustion engine of claim 2, wherein the valve is a bypass valve operable with the fuel delivery system at a location upstream of the heat sink heat exchanger for diverting at least a portion of the fuel flow around the heat sink heat exchanger to a location downstream of the heat sink heat exchanger.

7. The combustion engine of claim 1, wherein the oxygen reduction unit is a fuel oxygen conversion unit, and wherein the sensor of the control system is a fuel oxygen conversion sensor for sensing data indicative of a parameter of the fuel oxygen conversion unit.

8. The combustion engine of claim 1, wherein the sensor of the control system is a first sensor, and wherein the control system further comprises a second sensor also operable with the fuel delivery system for sensing data indicative of the operability of the oxygen reduction unit.

9. The combustion engine of claim 8, wherein the oxygen reduction unit is a fuel oxygen conversion unit, wherein the first sensor is a fuel oxygen conversion sensor for sensing data indicative of a parameter of the fuel oxygen conversion unit, and wherein the second sensor is an oxygen sensor for sensing data indicative of an oxygen level in the fuel flow within the fuel delivery system downstream of the fuel oxygen conversion unit.

10. The combustion engine of claim 1, wherein the combustion engine is an aeronautical gas turbine engine.

11. A method for operating a combustion engine having a combustion section, a fuel delivery system for providing a fuel flow to the combustion section, and a thermal management system having a heat sink heat exchanger in thermal communication with the fuel delivery system, the method comprising:

transferring heat to the fuel delivery system using the heat sink heat exchanger of the thermal management system;

monitoring a fuel delivery system health of the fuel delivery system, the fuel delivery system health indicative of an operability of an oxygen reduction unit of the fuel delivery system, the oxygen reduction unit comprising a contactor, a separator and a catalyst, the catalyst positioned in a recirculation loop in fluid communication with each the separator and the contactor, wherein the catalyst is supplied a separated gas flow from the separator and the contactor is supplied a flow from the catalyst, the oxygen reduction unit positioned upstream of the heat sink heat exchanger in the fuel delivery system for reducing an oxygen content of the fuel flow; and performing a maintenance operation in response to said monitoring the fuel delivery system health of the fuel delivery system;

wherein the monitoring the fuel delivery system health comprises sensing data via a sensor operable with the fuel delivery system, wherein the sensed data is indicative of a parameter of the oxygen reduction unit, the parameter being a temperature of the catalyst of the oxygen reduction unit, the catalyst operable to reduce or assist with reducing the oxygen content of the fuel flow, or a flow rate from the catalyst of the oxygen reduction unit.

12. The method of claim 11, wherein the parameter is the temperature of the catalyst of the oxygen reduction unit of the fuel delivery system.

13. The method of claim 11, wherein the sensor comprises a first sensor and a second sensor, and wherein said sensing data indicative of the operability of the oxygen reduction unit comprises sensing the parameter of the oxygen reduction unit with the first sensor and sensing an oxygen level of the fuel flow downstream of the oxygen reduction unit with the second sensor.

14. The method of claim 13, wherein said sensing data indicative of the operability of the oxygen reduction unit further comprises:

receiving data indicative of a failure condition from one of the first sensor or the second sensor;

receiving data indicative of the operability of the oxygen reduction unit being within a desired operability range from the other of the first sensor or the second sensor; and determining the operability of the oxygen reduction unit is within the desired operability range.

15. The method of claim 12, wherein said transferring said heat to the fuel delivery system using the heat sink heat exchanger of the thermal management system comprises transferring said heat from a thermal bus of the thermal management system to the fuel delivery system using the heat sink heat exchanger, wherein said sensing data indicative of the operability of the oxygen reduction unit comprises determining based on the data that the oxygen reduction unit is operating outside a desired operability range, and wherein said performing the maintenance operation comprises modifying at least one of the fuel flow through the fuel delivery system or a heat exchange fluid flow through the thermal bus in response to the oxygen reduction unit operating outside the desired operability range.

16. The method of claim 15, wherein the modifying the at least one of the fuel flow through the fuel delivery system or the heat exchange fluid flow through the thermal bus comprises diverting at least a portion of the fuel flow from a location upstream of the oxygen reduction unit around the oxygen reduction unit to a location downstream of the oxygen reduction unit.

17. The method of claim 15, wherein the modifying the at least one of the fuel flow through the fuel delivery system or the heat exchange fluid flow through the thermal bus comprises diverting at least a portion of the fuel flow from a location upstream of the heat sink heat exchanger around the heat sink heat exchanger to a location downstream of the heat sink heat exchanger.

18. The method of claim 15, wherein the modifying the at least one of the fuel flow through the fuel delivery system or the heat exchange fluid flow through the thermal bus comprises diverting at least a portion of the heat exchange fluid flow through the thermal bus either from a location upstream of the heat sink heat exchanger around the heat sink heat exchanger to a location downstream of the heat sink heat exchanger, from a location upstream of the heat source heat exchanger around the heat source heat exchanger to a location downstream of the heat source heat exchanger, or both.

19. The method of claim 11, wherein the monitoring the fuel delivery system health of the fuel delivery system comprises monitoring either an operability parameter of the fuel delivery system indicative of an operating time of the combustion engine, a number of operating cycles of the combustion engine, or both.

20. The method of claim 19, wherein the performing the maintenance operation in response to monitoring the fuel delivery system health of the fuel delivery system comprises providing an indicator to a user of the combustion engine indicative of the operability parameter.

\* \* \* \* \*